Nov. 10, 1942. L. J. MARTIN 2,301,562
ANTIAIRCRAFT AERIAL BOMB
Filed June 26, 1939
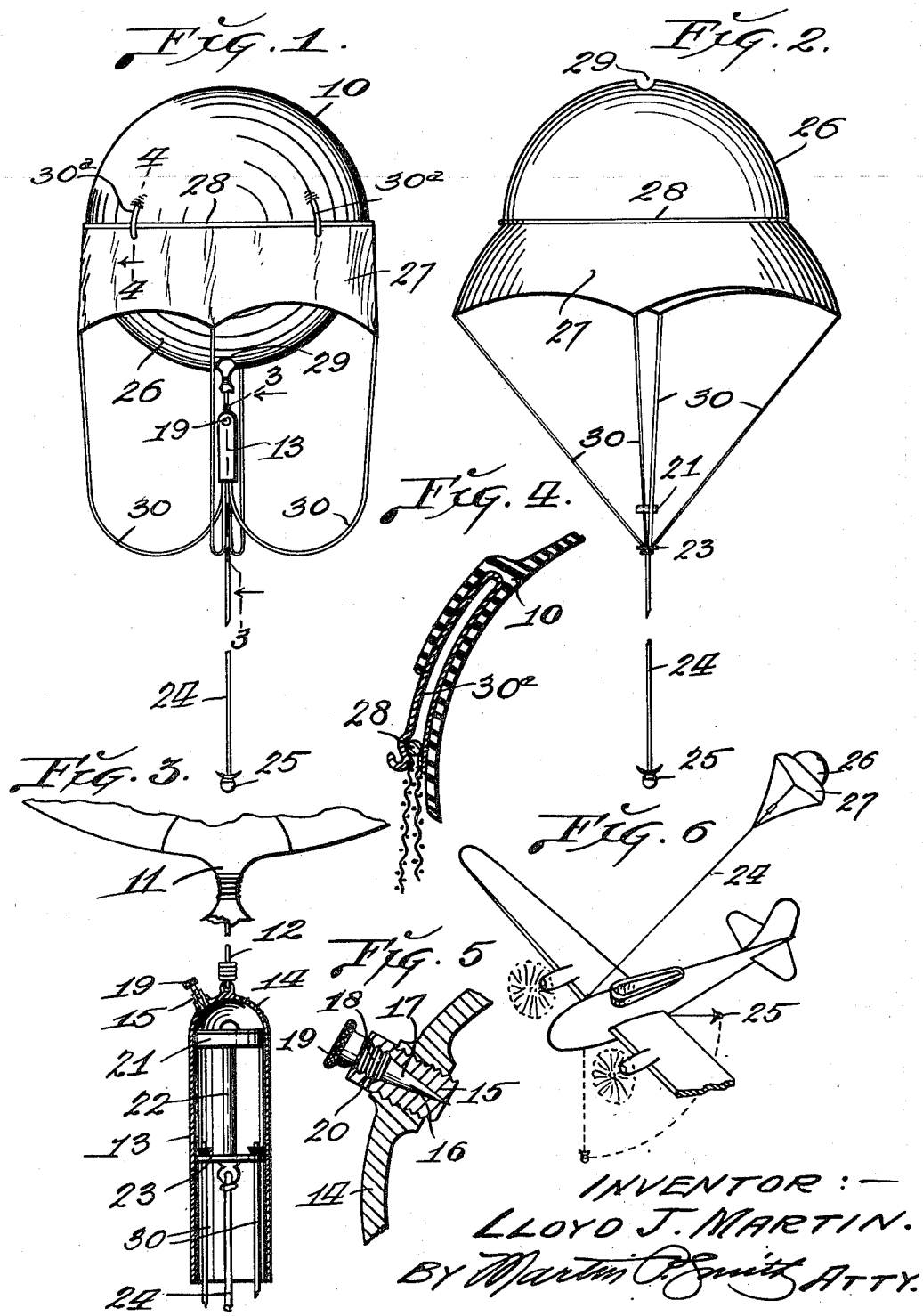
INVENTOR:—
LLOYD J. MARTIN.
BY Martin & Smith ATTY.

Patented Nov. 10, 1942

2,301,562

UNITED STATES PATENT OFFICE 2,301,562

ANTIAIRCRAFT AERIAL BOMB

Lloyd J. Martin, Beverly Hills, Calif.

Application June 26, 1939, Serial No. 281,179

3 Claims. (Cl. 102—9)

My invention relates to an aerial bomb especially applicable for use as a protection against enemy aircraft and, has for its principal object, the provision of relatively simple, practical and convenient means for elevating bomb carrying cables, wires, or the like, and maintaining the same at predetermined heights above the earth's surface for pre-determined periods of time.

A further object of my invention is, to provide means, preferably balloons or ballonettes, which when released carry the bomb suspending wires or cables to pre-determined heights and, said balloons having associated therewith parachutes which, after pre-determined periods of time become detached from the balloons or ballonettes and carry the suspended bombs slowly downward to earth and thereby avoiding explosion of the bombs at the time they contact with the earth or with buildings.

Further objects of my invention are, to connect the parachutes with the balloons or ballonettes so that there will be no, or little, interference with the upward travel of the balloons, further, to provide means whereby the intermediate portions of the parachutes are detachably connected to the balloons so as to maintain the central portions of the parachutes against the lower halves of the balloons and further, to provide a vacuum valve between each parachute and balloon, which vacuum valve is provided with simple and efficient means for controlling its action in effecting, after a pre-determined period of time, the release and disengagement of the parachute from the balloon.

With the foregoing and other objects in view, my invention consists in certain novel features of construction and arrangement of parts that will be hereinafter more fully described and claimed and illustrated in the accompanying drawing in which:

Fig. 1 is a side elevational view of an aerial bomb constructed in accordance with my invention and showing the same in elevated position for use.

Fig. 2 is an elevational view of the parachute as it appears when detached from the balloon for gradually carrying the suspended bomb to earth.

Fig. 3 is an enlarged vertical section taken approximately on the line 3—3 of Fig. 1.

Fig. 4 is an enlarged detail section taken on the line 4—4 of Fig. 1.

Fig. 5 is an enlarged detail section of the air inlet regulating means that is associated with the vacuum valve that controls the release of the parachute from the balloon.

Fig. 6 is a perspective view showing an airplane in contact with the bomb carrying wire or cable.

Referring by numerals to the accompanying drawing which illustrates a preferred embodiment of my invention, 10 designates a balloon or ballonette, preferably formed of rubber or rubberized fabric that is impervious to the passage of air and substantially spherical in shape with a neck portion 11 depending from its under side in order to permit the balloon to be filled with a lighter-than-air gas.

Depending from the neck 11 is a flexible member 12, for instance, a wire, cord, or cable, and suspended from the lower end thereof is a tubular member 13, preferably formed of light weight metal such as aluminium and, said tube being open at its lower end and closed at its upper end as designated by 14.

Seated in the wall of the upper end portion 14 of this tube is a plug 15 through which is formed an axial opening, the lower portion 16 of which is tapered toward its lower end so as to receive the corresponding tapered lower portion 17 of a plug valve. A portion of the valve body near its upper end is threaded as designated by 18 for engagement with the internally threaded upper portion of the opening 16 in plug 15 and, the upper end of the plug valve terminates in a head or disc 19.

Formed in that portion of the plug 15 that projects outwardly from the upper end 14 of the tube 13 is a small air inlet opening 20, the inner end thereof communicating with the bore or opening 16 of plug 15.

The valve structure just described provides simple and efficient means for permitting air to bleed or slowly seep through inlet aperture 20 and through opening 16 into the upper portion of tube 13.

Arranged for sliding movement within tube 13 is a piston-like head or disc 21 from which depends a centrally arranged rod 22 and, secured to the lower end of said rod is a disc 23. Secured to the center of this disc is one end of a depending flexible member 24, for instance, a wire or cable, and carried by the lower end thereof is a bomb 25, preferably of the conventional "spider" type. The bomb suspending member 24 may be several hundred or even several thousand feet in length.

The parachute utilized with the bomb suspending balloon is formed from thin, flexible material, preferably fabric, and said parachute includes a hemi-spherical central portion 26, from the lower edge of which depends an outwardly and downwardly flaring skirt portion 27.

Arranged between the connected edges of the parachute portions 26 and 27 is a cord 28 and, formed in the upper central portion of the upper member 26 is a small aperture 29 of sufficient size to permit the passage of vacuum valve tube 13. Flexible members 30, for instance, cords, wires, or cables, are connected to disc 23 and, the other ends of said flexible members are connected to the lower edge of the skirt portion 27 of the parachute.

In making the balloon and parachute ready for use, the upper portion 26 of the parachute is forced downwardly through the skirt portion 27 until said upper portion 26 assumes a bowl-like shape and, in such condition said portion 26 is applied to the lower half of the balloon 10 and is detachably connected thereto by engaging the cord 28 between the lower ends of the legs of substantially hairpin-shaped keepers 30ᵃ that are formed of resilient material, preferably metal, and the upper portions of which members are suitably secured to the outer surface of the balloon 10, preferably by being embedded in the material from which the balloon is formed, as illustrated in Fig. 4.

When the member 26 is applied to the lower half of the balloon as just described, the skirt portion 27 of the parachute hangs downwardly from the cord 28 that is engaged by the resilient keepers 30ᵃ as illustrated in Fig. 1 and, the neck of the balloon projects downwardly through opening 29 with the tube 13 suspended from said neck.

Valve plug 17 is now unscrewed so as to place ports or openings 16 and 20 in communication with each other and, piston 21 is now introduced into the open lower end of tube 13 and said piston, together with the rod 22 and disc 23, are now moved upward until said piston is positioned at its limit of movement in the chamber within tube 13. During this upward movement of the piston 21 in tube 13 practically all the air in the tube above the piston has been expelled through the communicating ports 16 and 20 and, the plug valve 17 is now screwed into plug 15 so as to practically close the port or opening 16.

Previous to the application of the parachute to the balloon, the latter is inflated with lighter-than-air gas so that said balloon and parts carried thereby will ascend to a pre-determined level above the earth's surface, for instance, several hundred or several thousand feet, and which level is determined by the size of the balloon, also the degree of its inflation with the lighter-than-air gas.

Plug valve 17 is now unscrewed to such a degree as to permit air to bleed or seep through the openings 20 and 16 to the chamber within the upper portion of tube 13 above the piston disc 21 and, by means of proper calibrations and by making the apertures 20 and 16 of proper size, the bleeding or seepage of air into the upper portion of the valve housing 13 may be accurately regulated and therefore, the timing of the vacuum valve in effecting release of the parachute from the balloon may be accurately pre-determined.

After the air inlet valve has been adjusted and set as just described, the balloon is released and during its ascent and while floating in the air after it has reached its upper limit of travel, the skirt portion of the parachute, together with parts carried thereby and the bomb carrying wire or cable 24, occupy the positions as illustrated in Fig. 1.

In the event that an enemy airplane makes contact with the bomb carrying cable 24, the forward movement of the airplane will exert pull on the upper portion of the cord or cable and the parachute connected thereto so that the skirt portion of said parachute will offer sufficient resistance to draw the engaged cable upwardly in front of the part of the airplane that may contact with the cable, thus materially shortening the distance between the engaged portion of the cable and the bomb carried by the lower end thereof so that the latter will, due to the continued forward travel of the airplane, be drawn upwardly so as to contact with some portion of the airplane, and as a result of such contact, the bomb will be fired, thereby destroying the airplane or rendering the same unfit for service.

After the bomb carrying balloon has been in the air for a pre-determined period of time and there has been no contact of the bomb suspending wire or cable and an airplane, the piston 21 as a result of the seepage of air into the chamber in cylinder 13 above said piston, will reach and discharge from the lower end of the vacuum valve housing and, the weight of the suspended bomb, the piston 21, rod 22, disc 23, and flexible connections 30, will exert sufficient downward pull upon the cord 28 so as to withdraw the same from between the ends of the legs of the retaining members 30ᵃ and, the balloon thus freed of the weight of the parts carried by the parachute will quickly ascend and the parachute will open with the parts positioned as illustrated in Fig. 2.

The balloon in leaving the parachute will draw valve housing 13 upwardly through the aperture 29 that is formed in the center of the parachute.

Upon release of the balloon as just described, the parachute will slowly drift downwardly to earth and this descent is so slow as to remove all possibility of the bomb being exploded as it contacts with the earth or with buildings. Thus the bomb and the parachute return to the earth's surface and may be subsequently associated with another balloon.

Thus it will be seen that I have provided an aerial bomb that is relatively simple in construction, inexpensive of manufacture and very effective in performing the functions for which it is intended.

It will be understood that minor changes in the size, form and construction of the various parts of my improved aerial bomb, may be made and substituted for those herein shown and described, without departing from the spirit of my invention, the scope of which is set forth in the appended claims.

I claim as my invention:

1. An aerial bomb comprising a balloon, a cylinder secured to and depending from said balloon, a piston arranged for operation within said cylinder, a bomb suspended from said piston, a parachute having a hemi-spherical central portion adapted to be positioned against the lower half of said balloon, there being an aperture formed in the center of said hemi-spherical portion of the parachute for the accommodation of the cylinder carried by the balloon, an outwardly flaring skirt portion secured to and depending from the edge of the hemi-spherical central portion of the parachute and flexible connections from the lower edge of the flaring skirt portion of said parachute and said piston.

2. An aerial bomb as set forth in claim 1 and with clips mounted on said balloon for receiving and releasably holding the connected edges of the hemi-spherical central portion and the upper edge of the skirt portion of said parachute.

3. An aerial bomb as set forth in claim 1 and with adjustable means in the upper portion of said cylinder for controlling the admission of air to the chamber within said cylinder above the piston therein.

LLOYD J. MARTIN.